US012561242B2

(12) United States Patent
Kim

(10) Patent No.: US 12,561,242 B2
(45) Date of Patent: Feb. 24, 2026

(54) METHOD AND SYSTEM FOR LOCALITY-PRESERVING SYSTEM MEMORY ADDRESS ENCODING

(71) Applicant: Samsung Electronics Co., Ltd., Gyeonggi-do (KR)

(72) Inventor: Jang Dae Kim, San Jose, CA (US)

(73) Assignee: Samsung Electronics Co. Ltd (KR)

( * ) Notice: Subject to any disclaimer, the term of this patent is extended or adjusted under 35 U.S.C. 154(b) by 0 days.

(21) Appl. No.: 18/606,597

(22) Filed: Mar. 15, 2024

(65) Prior Publication Data

US 2025/0199957 A1      Jun. 19, 2025

Related U.S. Application Data

(60) Provisional application No. 63/611,533, filed on Dec. 18, 2023.

(51) Int. Cl.
*G06F 12/06* (2006.01)
(52) U.S. Cl.
CPC ..................................... *G06F 12/06* (2013.01)
(58) Field of Classification Search
CPC .............................. G06F 12/06; G06F 12/0292
See application file for complete search history.

(56) References Cited

U.S. PATENT DOCUMENTS

| | | | | |
|---|---|---|---|---|
| 4,253,335 A | * | 3/1981 | Shimomura | ............. G01C 5/06 73/384 |
| 5,349,650 A | | 9/1994 | Imakura et al. | |

| | | | |
|---|---|---|---|
| 5,598,514 A | | 1/1997 | Purcell et al. |
| 6,308,249 B1 | | 10/2001 | Okazawa |
| 6,427,200 B1 | | 7/2002 | Wu |
| 6,629,187 B1 | | 9/2003 | Krueger et al. |
| 6,813,700 B2 | | 11/2004 | Fallah et al. |
| 7,278,008 B1 | | 10/2007 | Case et al. |
| 10,387,157 B2 | | 8/2019 | Lin |

(Continued)

FOREIGN PATENT DOCUMENTS

| | | |
|---|---|---|
| DE | 19943145 | 12/2000 |
| WO | WO 2015/153693 | 10/2015 |
| WO | WO 2023/030466 | 3/2023 |

OTHER PUBLICATIONS

Panda, Preeti Ranjan et al., "Low-Power Memory Mapping Through Reducing Address Bus Activity".

(Continued)

*Primary Examiner* — Chie Yew
(74) *Attorney, Agent, or Firm* — The Farrell Law Firm, P.C.

(57) ABSTRACT

A method and device are provided in which the memory subsystem receives a range of system addresses. An address encoder of the memory subsystem encodes the system addresses to generate encoded system addresses. A first number of least significant bits (LSBs) subject to change in encoding each of the system addresses in the range is based on a lesser of a second number of trailing 0s in a binary representation of the base address and a third number of trailing 0s in a binary representation of a fourth number of the system addresses in the range. In encoding the system addresses, bit values of remaining bits in the encoded system addresses are equal to corresponding bit values in the system addresses.

18 Claims, 4 Drawing Sheets

(56)　　　　　References Cited

U.S. PATENT DOCUMENTS

| | | | |
|---|---|---|---|
| 11,403,234 B2 | 8/2022 | Durham et al. | |
| 2005/0177665 A1* | 8/2005 | Ripy ....................... | H04L 12/52 |
| | | | 710/113 |
| 2009/0168227 A1* | 7/2009 | Blaum ............... | G11B 5/59688 |
| | | | 360/77.05 |
| 2014/0337572 A1* | 11/2014 | Weimer ................ | G06F 12/023 |
| | | | 711/114 |

OTHER PUBLICATIONS

IEEE Transactions on Very Large Scale Integration (VLSI) Systems, vol. 7, No. 3, Sep. 1999, pp. 309-320.

* cited by examiner

METHOD AND SYSTEM FOR LOCALITY-PRESERVING SYSTEM MEMORY ADDRESS ENCODING

PRIORITY

This application is based on and claims priority under 35 U.S.C. § 119 (e) to U.S. Provisional Patent Application Ser. No. 63/611,533, which was filed in the U.S. Patent and Trademark Office on Dec. 18, 2023, the entire content of which is incorporated herein by reference.

TECHNICAL FIELD

The present disclosure relates generally to reducing power consumption in memory operations, and more particularly, to a system and method capable of performing memory address encoding upstream of memory address buses to reduce toggling of address bus signals across an entire memory subsystem hierarchy.

SUMMARY

A memory subsystem may generally include a write address register, a write address bus, a read address register, a read address bus, and a set of memory macros (and/or flop arrays). Large random-access memories (RAMs) generally include smaller RAMs, which may be referred to as the set of memory macros (or subunits). Glue logic maps original input write/read address buses into write/read address busses of each memory macro (in simple arithmetic operations).

An address mapper for each memory macro translates a system address to an address bus of the corresponding memory macro. Memory macro address pin toggling has a geometrical distribution (e.g., $1+2+4+ \ldots +2^n$) in an incremental (or decremental) memory access pattern (e.g., first in, first out (FIFO), stack, or L2/L3 cache). A most significant bit (MSB) of the address bus is least toggled, and a least significant bit (LSB) of the address is most toggled, with the latter contributing to 50% of the address bus toggles. When not being accessed, write/read address busses of individual memory macros may be tied off. However, power is dissipated as each memory macro address bus is toggled.

To solve this problem, address encoding, such as gray encoding, may be incorporated into the address mappers to reduce address bus toggling of accessed memory macros.

Issues with the above approach include the scope of memory address encoding being limited to downstream memory macros, and the duplication of address encoding logic for each memory macro thereby affecting power consumption.

To overcome these issues, an address encoding scheme may be provided upstream of write/read address buses (hereafter referred to as processor side address encoding) to reduce toggling of address bus signals across the entire memory subsystem hierarchy, from the address registers to the write/read address buses of individual memory macros.

The above approach improves on previous methods in that it further reduces address toggle power consumption in the memory subsystem hierarchy and avoids duplication of encoding logic in the address mapper of each memory macro. To address changes to a memory access pattern caused by processor side address encoding, which leads to additional address changes crossing memory macros, address encoding on the processor-side further preserves memory access locality on write/read address buses of individual memory macros. Accordingly, the effect of encoding is contained to each memory macro and memory access crossing memory macros that drain power is prevented.

In an embodiment, a method is provided in which a memory subsystem receives a range of system addresses beginning with a base address. An address encoder of the memory subsystem encodes the system addresses to generate encoded system addresses. A first number of LSBs subject to change in encoding each of the system addresses in the range is based on a lesser of a second number of trailing 0s in a binary representation of the base address and a third number of trailing 0s in a binary representation of a fourth number of the system addresses in the range. In encoding the system addresses, bit values of remaining bits in the encoded system addresses are equal to corresponding bit values in the system addresses.

In an embodiment, a memory subsystem is provided that includes an address encoder. The address encoder is configured to receive a range of system addresses beginning with a base address. The address encoder is also configured to encode the system addresses to generate encoded system addresses. A first number of LSBs subject to change in encoding each of the system addresses in the range is based on a lesser of a second number of trailing 0s in a binary representation of the base address and a third number of trailing 0s in a binary representation of a fourth number of the system addresses in the range. In encoding the system addresses, bit values of remaining bits in the encoded system addresses are equal to corresponding bit values in the system addresses.

In an embodiment, a user equipment (UE) is provided that includes a processor and a non-transitory computer readable storage medium storing instructions. When executed, the instructions cause the processor to encode a range of system addresses beginning with a base address to generate encoded system addresses. A first number of LSBs subject to change in encoding each of the system addresses in the range is based on a lesser of a second number of trailing 0s in a binary representation of the base address and a third number of trailing 0s in a binary representation of a fourth number of the system addresses in the range. In encoding the system addresses, bit values of remaining bits in the encoded system addresses are equal to corresponding bit values in the system addresses.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
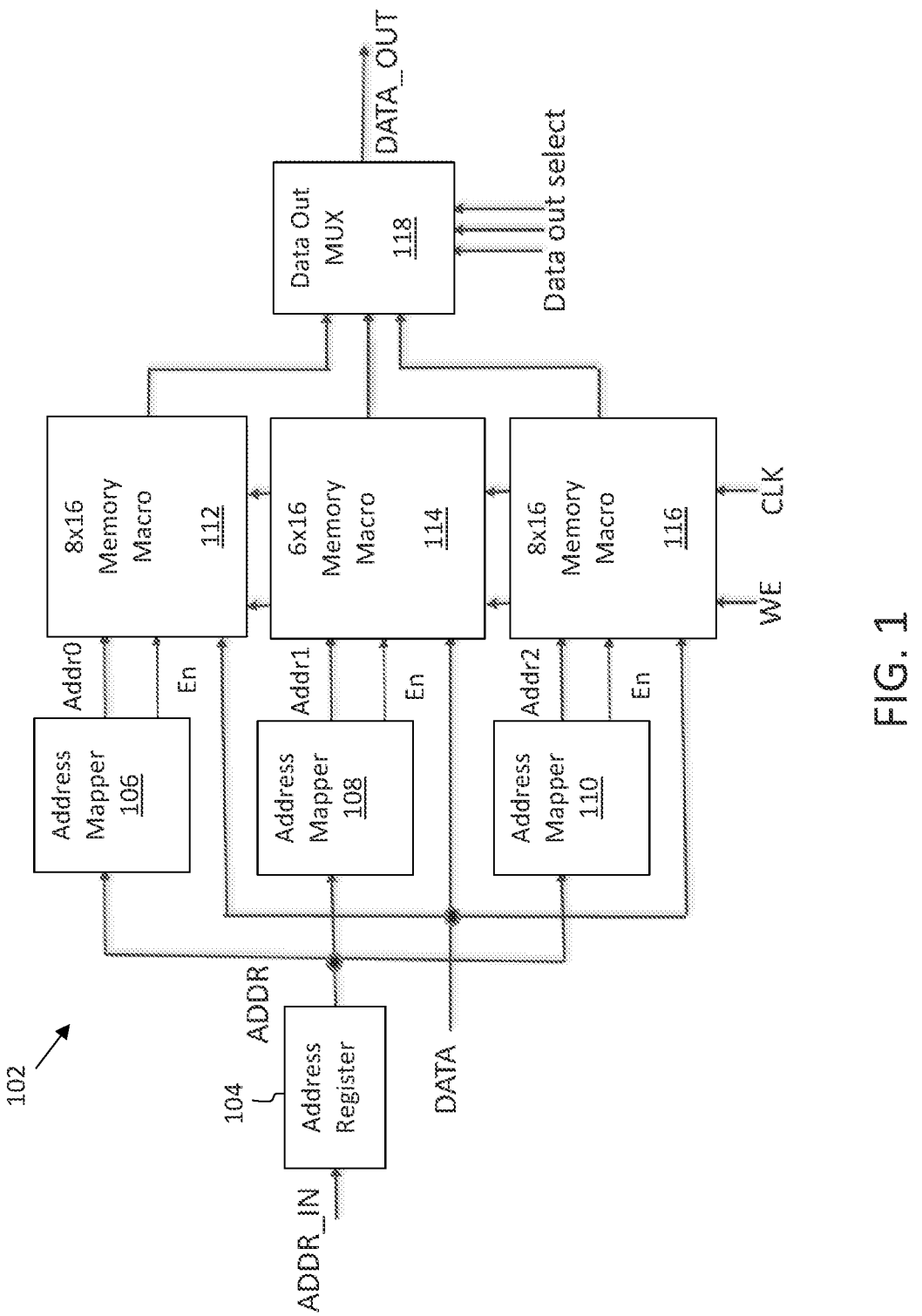
FIG. 1 is a diagram illustrating a single-port memory subsystem, according to an embodiment.

Hereinafter, various embodiments of the disclosure are described in detail with reference to the accompanying drawings. The same elements may be designated by the same or similar reference numerals although they are shown in different drawings.

In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure.

In addition, descriptions of well-known functions and constructions are omitted for clarity and conciseness.

The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items. Additionally, singular forms are intended to include plural forms unless the context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component but are not intended to limit the components in other aspects (e.g., importance or order).

If an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

The terms used herein are merely used to describe various embodiments of the present disclosure but are not intended to limit the present disclosure. In the present disclosure, the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art and are not to be interpreted to have ideal or excessively formal meanings unless clearly defined in the present disclosure.

An electronic device may be one of various types of electronic devices utilizing storage devices. The electronic device may use any suitable storage standard, such as, e.g., peripheral component interconnect express (PCIe), nonvolatile memory express (NVMe), NVMe-over-fabric (NVMeoF), advanced extensible interface (AXI), ultra-path interconnect (UPI), ethernet, transmission control protocol/Internet protocol (TCP/IP), remote direct memory access (RDMA), RDMA over converged ethernet (ROCE), fibre channel (FC), infiniband (IB), serial advanced technology attachment (SATA), small computer systems interface (SCSI), serial attached SCSI (SAS), Internet wide-area RDMA protocol (iWARP), etc., or any combination thereof. In some embodiments, an interconnect interface may be implemented with one or more memory semantic and/or memory coherent interfaces and/or protocols including one or more compute express link (CXL) protocols such as CXL.mem, CXL.io, and/or CXL.cache, Gen-Z, coherent accelerator processor interface (CAPI), cache coherent interconnect for accelerators (CCIX), etc., or any combination thereof. Any of the memory devices may be implemented with one or more of any type of memory device interface including double data rate (DDR), DDR2, DDR3, DDR4, DDR5, low-power DDR (LPDDRX), open memory interface (OMI), NVlink high bandwidth memory (HBM), HBM2, HBM3, and/or the like. The electronic devices may include, e.g., a portable communication device (e.g., a smart phone), a computer, a portable multimedia device, a portable medical device, a camera, a wearable device, or a home appliance. However, an electronic device is not limited to those described above.

As used herein, the term "module" may include a unit implemented in hardware, software, firmware, or combination thereof, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC), a co-processor, or field programmable gate arrays (FPGAs).

As used herein, the term address "encoding" may refer to an operation on an address that results in change in a memory access pattern, and the term "logical" input address may refer to an input address in an original memory access pattern in binary code before any address encoding.

FIG. 1 is a diagram illustrating a single-port memory device, according to an embodiment. Specifically, FIG. 1 illustrates a single-port memory subsystem 102 in which an address bus is used for both a write address and a read address. The memory subsystem 102 includes an address register 104, a first address mapper 106, a second address mapper 108, a third address mapper 110, a first memory macro 112, a second memory macro 114, a third memory macro 116, and an output data multiplexer 118.

A system address ADDR may be input to the address register 104 and provided to the first address mapper 106, the second address mapper 108, and the third address mapper 110, via an address bus. The first address mapper 106 translates the system address to address bus and enable signals of the first memory macro 112. The second address mapper 108 translates the system address to address bus and enable signals of the second memory macro 114. The third address mapper 110 translates the system address to address bus and enable signals of the third memory macro 116. A data signal is provided directly to each of the memory macros 112, 114, and 116. A write enable (WE) signal and clock (CLK) signal are also provided to each of the memory macros 112, 114, and 116.

The memory subsystem 102 may be a 22×16 (words by bits) memory device, implemented with the first memory macro 112 as an 8×16 memory device, the second memory macro 114 as a 6×16 memory device, and the third memory macro 116 as an 8×16 memory macro. The memory devices' sizes are used for exemplary purposes, and embodiments are not limited thereto. An input address bus for the 22×16 memory device may have 5 bits and an address space from decimal 0 to decimal 21. The memory macros 112, 114, and 116 may have 3-bit address buses, and each memory macro is attributed to a range of addresses from the address space. Specifically, the first memory macro 112 may be attributed to a range of eight system addresses beginning from decimal 0 (base address) to decimal 7, the second memory macro 114 may be attributed to a range of six system addresses beginning from decimal 8 (base address) to decimal 13, and the third memory macro 116 may be attributed to a range of eight system addresses beginning from decimal 14 (base address) to decimal 21.

The memory macros 112, 114, are 106 may be coupled in a glue logic. The system address may be mapped by the glue logic to a corresponding address bus for each memory macro. The glue logic may also provide write/read enable signals to each memory macro, based on the input write/read addresses. Additionally, the glue logic may select data to be output from the memory macros using the multiplexer 118 and the read-enable signals of the memory macros with appropriate delay. Specifically, a data output selection signal may be received at the multiplexer 118 to multiplex and output data from one of the memory macros 112, 114, and 116.

The address buses of those memory macros whose address ranges are off of a current address and are not being accessed may be tied off (e.g., their enable signals are de-asserted) to conserve pin toggle power consumption. Additionally, address encoding may be incorporated in the address mappers 106, 108, and 110 to further reduce address bus toggling at memory macros when accessed.

As described above, a system address may be translated into addresses for the individual memory macros 112, 114, and 116 via the corresponding address mappers 106, 108, and 110. Table 1 shows an address translation mapping for the memory subsystem 102 of FIG. 1.

TABLE 1

| System address ADDR | First macro Addr0 | Second macro Addr1 | Third macro Addr2 |
|---|---|---|---|
| 0 (5'b00000) | 0 (3'b000) | 0 (3'b000) | 0 (3'b000) |
| 1 (5'b00001) | 1 (3'b001) | 0 (3'b000) | 0 (3'b000) |
| 2 (5'b00010) | 2 (3'b010) | 0 (3'b000) | 0 (3'b000) |
| 3 (5'b00011) | 3 (3'b011) | 0 (3'b000) | 0 (3'b000) |
| 4 (5'b00100) | 4 (3'b100) | 0 (3'b000) | 0 (3'b000) |
| 5 (5'b00101) | 5 (3'b101) | 0 (3'b000) | 0 (3'b000) |
| 6 (5'b00110) | 6 (3'b110) | 0 (3'b000) | 0 (3'b000) |
| 7 (5'b00111) | 7 (3'b111) | 0 (3'b000) | 0 (3'b000) |
| 8 (5'b01000) | 0 (3'b000) | 0 (3'b000) | 0 (3'b000) |
| 9 (5'b01001) | 0 (3'b000) | 1 (3'b001) | 0 (3'b000) |
| 10 (5'b01010) | 0 (3'b000) | 2 (3'b010) | 0 (3'b000) |
| 11 (5'b01011) | 0 (3'b000) | 3 (3'b011) | 0 (3'b000) |
| 12 (5'b01100) | 0 (3'b000) | 4 (3'b100) | 0 (3'b000) |
| 13 (5'b01101) | 0 (3'b000) | 5 (3'b101) | 0 (3'b000) |
| 14 (5'b01110) | 0 (3'b000) | 0 (3'b000) | 0 (3'b000) |
| 15 (5'b01111) | 0 (3'b000) | 0 (3'b000) | 1 (3'b001) |

TABLE 1-continued

| System address ADDR | First macro Addr0 | Second macro Addr1 | Third macro Addr2 |
|---|---|---|---|
| 16 (5'b10000) | 0 (3'b000) | 0 (3'b000) | 2 (3'b010) |
| 17 (5'b10001) | 0 (3'b000) | 0 (3'b000) | 3 (3'b011) |
| 18 (5'b10010) | 0 (3'b000) | 0 (3'b000) | 4 (3'b100) |
| 19 (5'b10011) | 0 (3'b000) | 0 (3'b000) | 5 (3'b101) |
| 20 (5'b10100) | 0 (3'b000) | 0 (3'b000) | 6 (3'b110) |
| 21 (5'b10101) | 0 (3'b000) | 0 (3'b000) | 7 (3'b111) |

In translating the system address ADDR, the address mapper for each memory macro subtracts a corresponding base address from the system address ADDR. A base address for the first memory macro 112 is 0 (5'b00000), a base address for the second memory macro 114 is 8 (5'b01000), and a base address for the third memory macro 116 is 14 (5'b01110). When a memory macro is not accessed (i.e., system address is outside of the range of the memory macro), the respective address mapper ties off the address bus of that memory macro with 0 (3'b000) to prevent unnecessary toggling (and accompanying pin toggle power consumption).

For the first and second memory macros 112 and 114, all three bits of the translated addresses Addr0 and Addr1 are the same as corresponding bits of the system address ADDR when those memory macros are accessed. However, for the third memory macro 116, only the LSB of the translated address Addr2 matches a corresponding bit of the system address ADDR when the third memory macro 116 is accessed. These matching lower address bits may be identified as the trailing 0's in their corresponding base addresses in binary representation.

For example, since the base address of the first memory macro 112 is decimal 0, which has a 5-bit binary representation of 5'b00000, all three bits of the translated address Addr0 will mirror the corresponding bits of the system address ADDR when the first memory macro 112 is accessed. Similarly, since the base address of the second memory macro 114 is decimal 8, which has a 5-bit binary representation of 5'b01000, all three bits of the translated address Addr1 will mirror the corresponding bits of the system address ADDR when the second memory macro 114 is accessed. Since the base address of the third memory macro 116 is decimal 14, which has a 5-bit binary representation of 5'b01110, only the LSB of the translated address Addr2 will mirror the corresponding bit of the system address ADDR when the third memory macro 116 is accessed. The above-described mirroring is a characteristic of the address mapper, which enables address encoding in the upstream of the system address ADDR, such as on the address register 104, for each memory macro.

Various address encoding schemes have been described for embedding address encoding in the address mapper for each memory macro. In order to reduce address signal toggle power consumption across the entire memory subsystem hierarchy, address encoding may be performed in the upstream to encompass system address registers and accompanying address buses. Such encoding schemes in the address mappers may be ported to the upstream of the system address ADDR with the added restriction that the encoding is limited to the mirroring lower bits of the system address.

A memory access pattern often has locality, which has an important implication in the memory subsystem hierarchy. Memory address change crossing from one memory macro to another results in changes to multiple memory macro address buses and enable signals, thereby consuming more power. As memory address encoding changes the memory access pattern, it may lead to additional address changes crossing memory macros, thereby affecting power consumption. Systematic methods of address encoding on the processor side in upstream of the system address ADDR are provided herein that preserve memory access locality to individual memory macros, thereby containing the encoding effect (i.e., changes in the memory access pattern) to each individual memory macro.

Accordingly, address encoding on the processor side upstream of the memory subsystem must be a one-to-one and onto mapping for each memory macro. With respect to a memory macro with n entries, the trailing 0's in the binary representation of number n may be identified. Changing the corresponding lower bits in the system address is equivalent to subset encoding.

Figure 2:
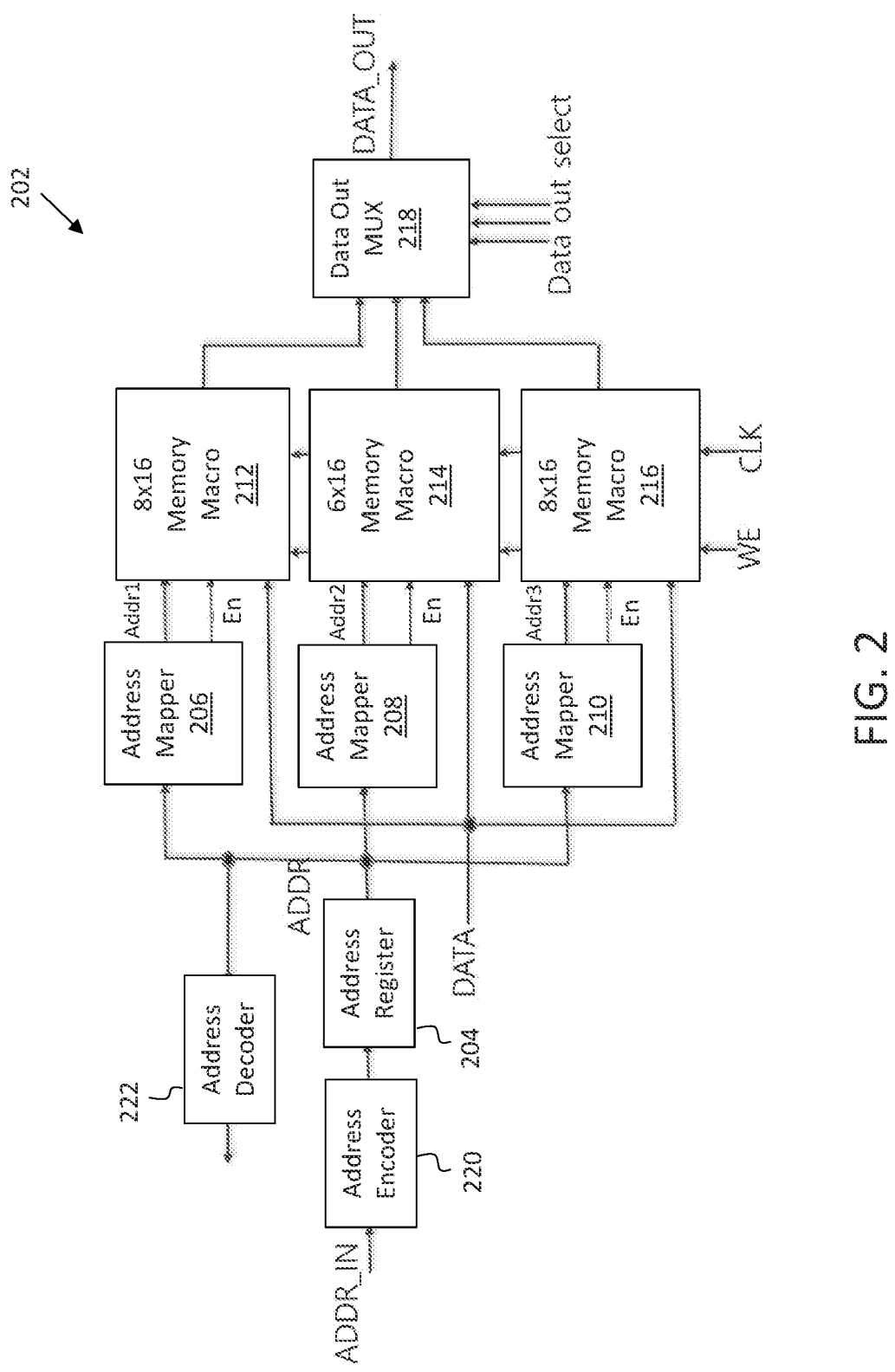
FIG. 2 is a diagram illustrating a single-port memory subsystem with processor-side address encoding, according to an embodiment.

FIG. 2 is a diagram illustrating a single-port memory subsystem having processor-side address encoding, according to an embodiment. Specifically, FIG. 2 illustrates a single-port 22×16 (words by bits) memory subsystem 202 in which an address bus is used for both a write address and a read address. The memory subsystem 202 of FIG. 2 includes substantially similar components to the memory subsystem 102 of FIG. 1, with the exception of a locality-preserving address encoder 220 disposed before an address register 204, and an optional corresponding decoder 222 disposed after the address register 204 to recover an unencoded registered address. First, second, and third address mappers 206, 208, and 210 of FIG. 2 correspond to the first, second, and third address mappers 106, 108, and 110 of FIG. 1. First, second, and third memory macros 212, 214, and 216 of FIG. 2 correspond to the first, second, and third memory macros 112, 114, and 116 of FIG. 1. An output data multiplexer 218 of FIG. 2 corresponds to the output data multiplexer 118 of FIG. 1. Similarly, the memory devices' sizes are used for exemplary purposes, and embodiments are not limited thereto.

A memory access pattern is often incremental in memories such as FIFO, stack, and L2/L3 cache, and address pin toggling has geometrical distribution (e.g., $1+2+4+ \ldots +2^n$). Toggling of the LSB contributes to approximately 50% of the toggling for an address bus. Gray encoding on the bus halves the toggling rate of each bit, without changing the MSB, (e.g., $1+1+2+ \ldots +2^{n-1}$). Locality-preserving gray encoding may be employed on some or all address bits subject to change in the encoding for each of the memory macros.

For example, the first memory macro 212 is fully decoded with 8 entries, with three trailing 0s in the binary representation of the number of entries (4'b 1000). Since the base address of the first memory macro 212 has five trailing 0s, as described above with respect to FIG. 1, any encoding on the lower three address bits for the address range beginning from 0 (5'b00000) to 7 (5'b00111) maps to the first memory macro 212. The second memory macro 214 is not fully decoded, having six entries, with a single trailing 0 in the binary representation 3'b 110 of the number of entries. While the base address of the second macro 214 has three trailing 0s, as described above with respect to FIG. 1, only the LSB may be changed for the address range beginning from 8 (5'b01000) to 13 (5'b01101) due to the single trailing 0 in the binary representation of the number of entries. The third memory macro 216 is fully decoded with 8 entries, with three trailing 0s in the binary representation of the number of entries (4'b 1000). However, because the base address of the third memory macro 216 has only a single trailing 0, only the LSB may be changed for the address range beginning from 14 (5'b01110) to 21 (5'b 10101). Table 2 shows address mapping with range-specific Gray encoding on the processor side for each memory macro.

TABLE 2

| Unencoded system address ADDR_IN | Encoded system address ADDR | First macro Addr0 | Second macro Addr1 | Third macro Addr2 |
|---|---|---|---|---|
| 0 (5'b00000) | 0 (5'b00000) | 0 (3'b000) | 0 (3'b000) | 0 (3'b000) |
| 1 (5'b00001) | 1 (5'b00001) | 1 (3'b001) | 0 (3'b000) | 0 (3'b000) |
| 2 (5'b00010) | 3 (5'b00011) | 3 (3'b011) | 0 (3'b000) | 0 (3'b000) |
| 3 (5'b00011) | 2 (5'b00010) | 2 (3'b010) | 0 (3'b000) | 0 (3'b000) |
| 4 (5'b00100) | 6 (5'b00110) | 6 (3'b110) | 0 (3'b000) | 0 (3'b000) |
| 5 (5'b00101) | 7 (5'b00111) | 7 (3'b111) | 0 (3'b000) | 0 (3'b000) |
| 6 (5'b00110) | 5 (5'b00101) | 5 (3'b101) | 0 (3'b000) | 0 (3'b000) |
| 7 (5'b00111) | 4 (5'b00100) | 4 (3'b100) | 0 (3'b000) | 0 (3'b000) |
| 8 (5'b01000) | 8 (5'b01000) | 0 (3'b000) | 0 (3'b000) | 0 (3'b000) |
| 9 (5'b01001) | 9 (5'b01001) | 0 (3'b000) | 1 (3'b001) | 0 (3'b000) |
| 10 (5'b01010) | 11 (5'b01011) | 0 (3'b000) | 3 (3'b011) | 0 (3'b000) |
| 11 (5'b01011) | 10 (5'b01010) | 0 (3'b000) | 2 (3'b010) | 0 (3'b000) |
| 12 (5'b01100) | 12 (5'b01100) | 0 (3'b000) | 4 (3'b100) | 0 (3'b000) |
| 13 (5'b01101) | 13 (5'b01101) | 0 (3'b000) | 5 (3'b101) | 0 (3'b000) |
| 14 (5'b01110) | 15 (5'b01111) | 0 (3'b000) | 0 (3'b000) | 1 (3'b001) |
| 15 (5'b01111) | 14 (5'b01110) | 0 (3'b000) | 0 (3'b000) | 0 (3'b000) |
| 16 (5'b10000) | 16 (5'b10000) | 0 (3'b000) | 0 (3'b000) | 2 (3'b010) |
| 17 (5'b10001) | 17 (5'b10001) | 0 (3'b000) | 0 (3'b000) | 3 (3'b011) |
| 18 (5'b10010) | 19 (5'b10011) | 0 (3'b000) | 0 (3'b000) | 5 (3'b101) |
| 19 (5'b10011) | 18 (5'b10010) | 0 (3'b000) | 0 (3'b000) | 4 (3'b100) |
| 20 (5'b10100) | 20 (5'b10100) | 0 (3'b000) | 0 (3'b000) | 6 (3'b110) |
| 21 (5'b10101) | 21 (5'b10101) | 0 (3'b000) | 0 (3'b000) | 7 (3'b111) |

As an alternative, for a common processor-side encoding for all three memory macros, irrespective of address ranges, the encoding may be limited to the LSB for all three memory macros, which is referred to as LSB Gray encoding. This common encoding is unconditional and irrespective of address ranges. Table 3 shows address mapping with LSB Gray encoding on the processor side for all memory macros. The LSB Gray encoding reduces overall address bus toggling by approximately 25% with a single XOR gate. The corresponding Address Decoder is ADDR[1] ^ADDR [0] (which corresponds to ADDR_IN[1] ^(ADDR_IN[1] ^ADDR_IN [0])= (ADDR_IN[1] ^ADDR_IN[1]) ^ADDR_IN [0]=ADDR_IN [0]), taking another XOR gate.

TABLE 3

| Unencoded system address ADDR_IN | Encoded system address ADDR | First macro Addr0 | Second macro Addr1 | Third macro Addr2 |
|---|---|---|---|---|
| 0 (5'b00000) | 0 (5'b00000) | 0 (3'b000) | 0 (3'b000) | 0 (3'b000) |
| 1 (5'b00001) | 1 (5'b00001) | 1 (3'b001) | 0 (3'b000) | 0 (3'b000) |
| 2 (5'b00010) | 3 (5'b00011) | 3 (3'b011) | 0 (3'b000) | 0 (3'b000) |
| 3 (5'b00011) | 2 (5'b00010) | 2 (3'b010) | 0 (3'b000) | 0 (3'b000) |
| 4 (5'b00100) | 4 (5'b00100) | 4 (3'b100) | 0 (3'b000) | 0 (3'b000) |
| 5 (5'b00101) | 5 (5'b00101) | 5 (3'b101) | 0 (3'b000) | 0 (3'b000) |
| 6 (5'b00110) | 7 (5'b00111) | 7 (3'b111) | 0 (3'b000) | 0 (3'b000) |
| 7 (5'b00111) | 6 (5'b00110) | 6 (3'b110) | 0 (3'b000) | 0 (3'b000) |
| 8 (5'b01000) | 8 (5'b01000) | 0 (3'b000) | 0 (3'b000) | 0 (3'b000) |
| 9 (5'b01001) | 9 (5'b01001) | 0 (3'b000) | 1 (3'b001) | 0 (3'b000) |
| 10 (5'b01010) | 11 (5'b01011) | 0 (3'b000) | 3 (3'b011) | 0 (3'b000) |
| 11 (5'b01011) | 10 (5'b01010) | 0 (3'b000) | 2 (3'b010) | 0 (3'b000) |
| 12 (5'b01100) | 12 (5'b01100) | 0 (3'b000) | 4 (3'b100) | 0 (3'b000) |
| 13 (5'b01101) | 13 (5'b01101) | 0 (3'b000) | 5 (3'b101) | 0 (3'b000) |
| 14 (5'b01110) | 15 (5'b01111) | 0 (3'b000) | 0 (3'b000) | 1 (3'b001) |
| 15 (5'b01111) | 14 (5'b01110) | 0 (3'b000) | 0 (3'b000) | 0 (3'b000) |
| 16 (5'b10000) | 16 (5'b10000) | 0 (3'b000) | 0 (3'b000) | 2 (3'b010) |
| 17 (5'b10001) | 17 (5'b10001) | 0 (3'b000) | 0 (3'b000) | 3 (3'b011) |
| 18 (5'b10010) | 19 (5'b10011) | 0 (3'b000) | 0 (3'b000) | 5 (3'b101) |
| 19 (5'b10011) | 18 (5'b10010) | 0 (3'b000) | 0 (3'b000) | 4 (3'b100) |

TABLE 3-continued

| Unencoded system address ADDR_IN | Encoded system address ADDR | First macro Addr0 | Second macro Addr1 | Third macro Addr2 |
|---|---|---|---|---|
| 20 (5'b10100) | 20 (5'b10100) | 0 (3'b000) | 0 (3'b000) | 6 (3'b110) |
| 21 (5'b10101) | 21 (5'b10101) | 0 (3'b000) | 0 (3'b000) | 7 (3'b111) |

Memory macros may be a power-of-two ($2^n$) or an integer multiple of a power-of-two ($m*2^n$), and their base addresses may have multiple trailing 0's. Accordingly, a common encoding may be of a significant size. At minimum, LSB Gray encoding may be available since memory macros have an even number of entries.

Thus, address encoding may be moved from individual address mappers to the processor side to encompass address registers and associated address buses, thereby reducing address toggle power consumption in the entire memory subsystem hierarchy. Address encoding on the processor side also avoids duplication of encoding logic in each address mapper. The encoding on the processor side further preserves memory access locality (which may exist in the original memory access pattern) to each memory macro, as if the address encoding is in each memory macro's address mapper.

Address encoding on the processor side is more restrictive than similar encoding in each memory macro's address mapper. Since address toggling may have geometrical distribution over address bits, the restrictiveness of processor-side address encoding on higher bits may be less impactful on overall power saving. Reduction of address register toggling with the processor-side address encoding far outweighs the restrictiveness of processor-side address encoding. Thus, processor-side address encoding in the upstream is preferable over similar encoding downstream in the memory subsystem hierarchy for its wider scope and effectiveness in reducing memory address toggle power consumption with less cost.

Figure 3:
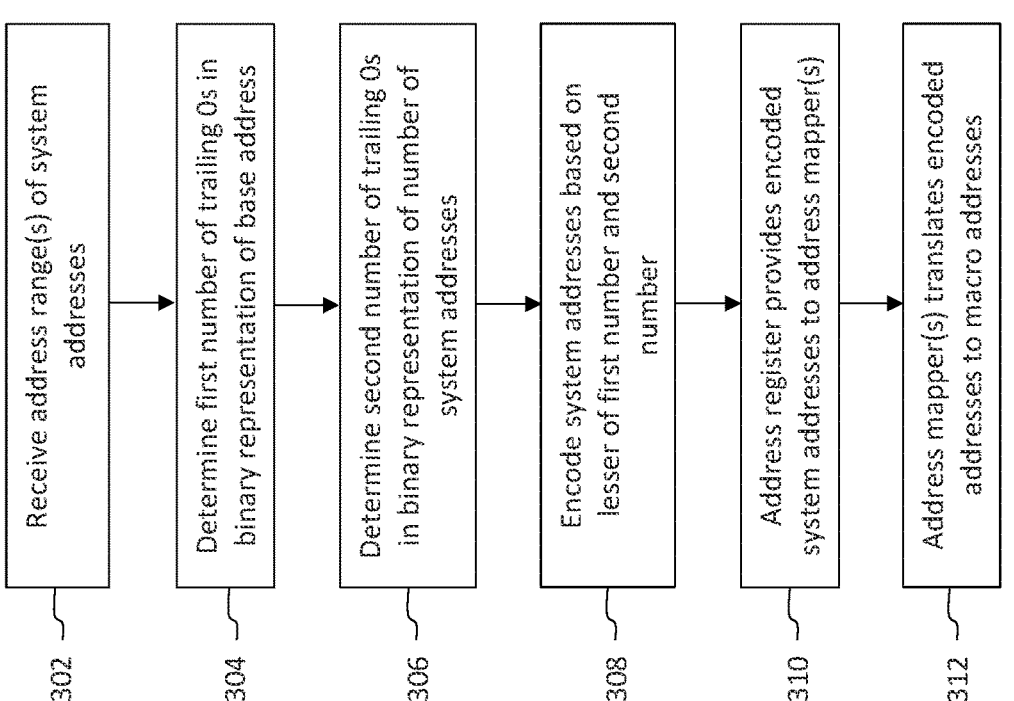
FIG. 3 is a flowchart illustrating a method of processor-side address encoding in a memory subsystem, according to an embodiment.

FIG. 3 is a flow chart illustrating an operating method of a memory subsystem, according to an embodiment.

Referring to FIG. 3, at 302, the memory subsystem receives an address at least in an address range of system addresses. The memory subsystem may include at least an address encoder, an address register, an address mapper, and a memory macro (or a memory subunit) connected to the address mapper. The address range may begin with a base address corresponding to the memory macro (or subunit) to be accessed.

The memory subsystem may include a plurality of address mappers and a plurality of memory macros (or subunits), with each address mapper corresponding to a different memory macro (or subunit). The address range may be one of a plurality of disjoint address ranges. Each address range may correspond to a different memory macro (or subunit) and begins with a different base address.

At 304, the address encoder may determine a first number of trailing 0s in a binary representation of the base address. At 306, the address encoder may determine a second number of trailing 0s in a binary representation of the number of system addresses in the address range. When an address in a first address range of a plurality of disjoint address ranges is received, the first number and the second number may be determined for the first address range.

At 308, the address encoder encodes the address in the first address range of the system addresses to generate an encoded system address. A number of LSBs subject to change in the address is based on the lesser of the first number of trailing 0s in a binary representation of the base address and the second number of trailing 0s in a binary representation of the number of system addresses in the first address range. Bit values of the remaining bits in the encoded system address are equal to corresponding bit values in the address. The encoding performed by the address encoder may be Gray encoding.

When an address in an address range of a plurality of disjoint address ranges is received, the lesser of the first number and the second number may be determined for the address range. The number of LSBs subject to change may be determined individually for the address range or may be a common number determined based on the lesser of the first number and the second number across all of the address ranges.

At 310, the address register of the memory subsystem receives the encoded system address and provides the encoded system address to the address mappers in the memory subsystem. For an embodiment with a plurality of disjoint address ranges, the address register may receive encoded system addresses of all the address ranges and provide the encoded system address ranges to all the address mappers.

At 312, the address mapper of the memory subsystem translates the encoded system addresses to a macro addresses for the memory macro. For a range of encoded system addresses that correspond to the memory macro of the address mapper (e.g., memory macro is accessed), the address mapper subtracts the corresponding base address of the address range from the encoded system addresses. For a range of encoded system addresses that do not correspond to the memory macro of the address mapper (e.g., a different memory macro is accessed), the address mapper ties off the address bus of that memory macro with a value such as 0 to prevent toggling.

Figure 4:
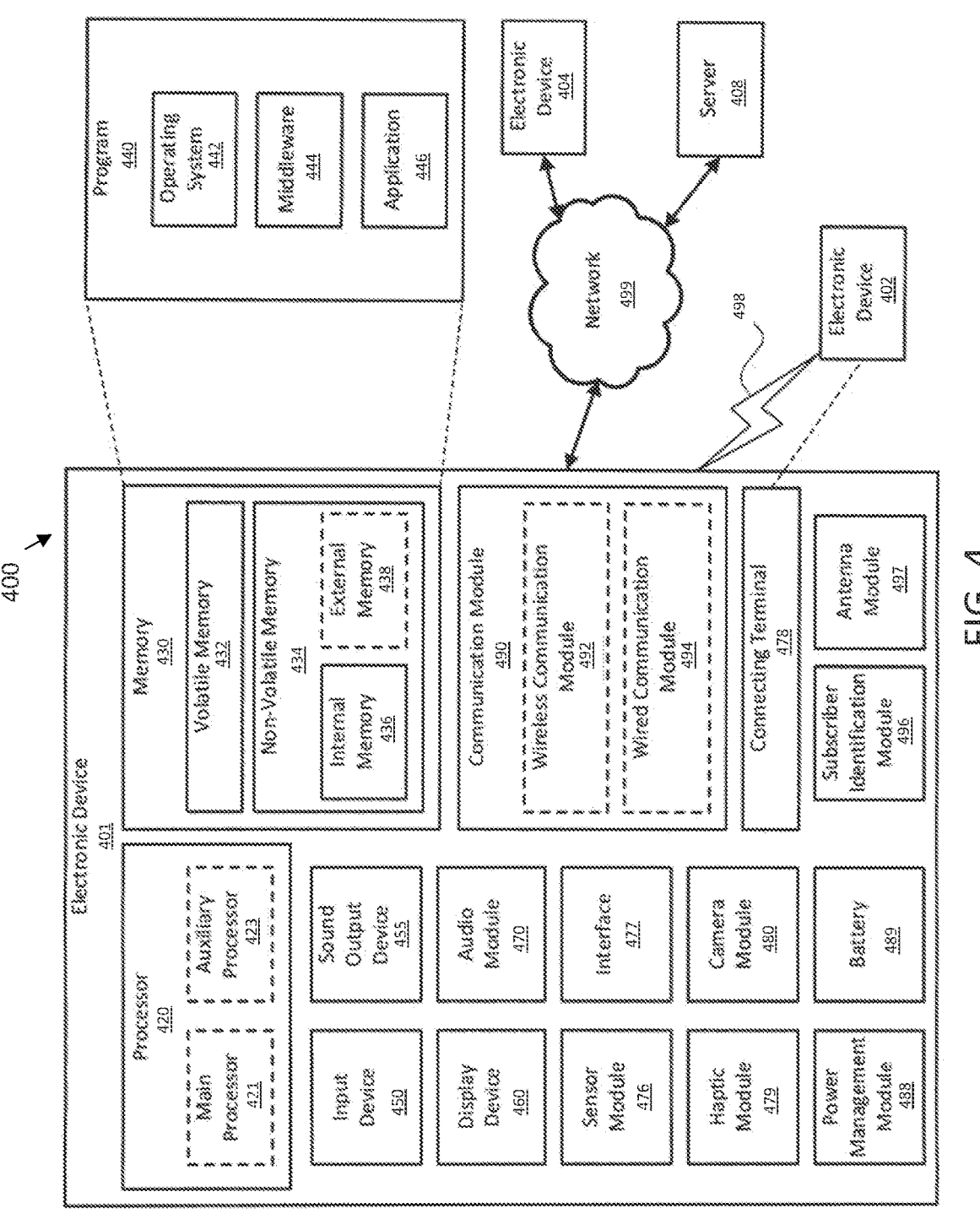
FIG. 4 is a block diagram illustrating an electronic device in a network environment, according to an embodiment.

FIG. 4 illustrates an electronic device in a network environment, according to an embodiment.

Referring to FIG. 4, the electronic device 401, e.g., a mobile terminal including GPS functionality, in the network environment 400 may communicate with an electronic device 402 via a first network 498 (e.g., a short-range wireless communication network), or an electronic device 404 or a server 408 via a second network 499 (e.g., a long-range wireless communication network). The electronic device 401 may communicate with the electronic device 404 via the server 408. The electronic device 401 may include a processor 420, a memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497 including a global navigation satellite system (GNSS) antenna. In one embodiment, at least one (e.g., the display device 460 or the camera module 480) of the components may be omitted from the electronic device 401, or one or more other components may be added to the electronic device 401. In one embodiment, some of the components may be implemented as a single integrated circuit (IC). For example, the sensor module 476 (e.g., a fingerprint sensor, an iris sensor, or an illuminance sensor) may be embedded in the display device 460 (e.g., a display).

The processor 420 may execute, for example, software (e.g., a program 440) to control at least one other component (e.g., a hardware or a software component) of the electronic device 401 coupled with the processor 420 and may perform various data processing or computations.

As at least part of the data processing or computations, the processor 420 may load a command or data received from another component (e.g., the sensor module 476 or the communication module 490) in volatile memory 432, process the command or the data stored in the volatile memory 432, and store resulting data in non-volatile memory 434. The processor 420 may include a main processor 421 (e.g., a CPU or an application processor, and an auxiliary processor 423 (e.g., a graphics processing unit (GPU), an image signal processor (ISP), a sensor hub processor, or a communication processor (CP)) that is operable independently from, or in conjunction with, the main processor 421. Additionally or alternatively, the auxiliary processor 423 may be adapted to consume less power than the main processor 421 or execute a particular function. The auxiliary processor 423 may be implemented as being separate from, or a part of, the main processor 421.

The auxiliary processor 423 may control at least some of the functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to one embodiment, the auxiliary processor 423 (e.g., an ISP or a CP) may be implemented as part of another component (e.g., the camera module 480 or the communication module 490) functionally related to the auxiliary processor 423.

The memory 430, e.g., a memory device as illustrated in FIG. 2, may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to one embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to one embodiment, the audio module 470 may obtain the sound via the input device 450, or output the sound via the sound output device 455 or a headphone of an external electronic device 402 directly (e.g., wiredly) or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. The sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device 402 directly (e.g., wiredly) or wirelessly. According to one embodiment, the interface 477 may include, for example, a high-definition multimedia interface (HDMI), a universal serial bus (USB) interface, a secure digital (SD) card interface, or an audio interface.

A connecting terminal 478 may include a connector via which the electronic device 401 may be physically connected with the external electronic device 402. According to one embodiment, the connecting terminal 478 may include, for example, an HDMI connector, a USB connector, an SD card connector, or an audio connector (e.g., a headphone connector).

The haptic module 479 may convert an electrical signal into a mechanical stimulus (e.g., a vibration or a movement) or an electrical stimulus which may be recognized by a user via tactile sensation or kinesthetic sensation. According to one embodiment, the haptic module 479 may include, for example, a motor, a piezoelectric element, or an electrical stimulator.

The camera module 480 may capture a still image or moving images. According to one embodiment, the camera module 480 may include one or more lenses, image sensors, ISPs, or flashes.

The power management module 488 may manage power supplied to the electronic device 401. The power management module 488 may be implemented as at least part of, for example, a power management integrated circuit (PMIC).

The battery 489 may supply power to at least one component of the electronic device 401. According to one embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more CPs that are operable independently from the processor 420 (e.g., the application processor) and supports a direct (e.g., wired) communication or a wireless communication. According to one embodiment, the communication module 490 may include a wireless communication module 492 (e.g., a cellular communication module, a short-range wireless communication module, or a GNSS communication module) or a wired communication module 494 (e.g., a local area network (LAN) communication module or a power line communication (PLC) module). A corresponding one of these communication modules may communicate with the external electronic device via the first network 498 (e.g., a short-range communication network, such as Bluetooth™, wireless-fidelity (Wi-Fi) direct, or a standard of the Infrared Data Association (IrDA)) or the second network 499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 492 may identify and authenticate the electronic device 401 in a communication network, such as the first network 498 or the second network 499, using subscriber information (e.g., international mobile subscriber identity (IMSI)) stored in the SIM 496.

The antenna module 497 may transmit or receive a signal or power to or from the outside (e.g., the external electronic device) of the electronic device 401. According to one embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 401 and the external electronic device 404 via the server 408 coupled with the second network 499. Each of the electronic devices 402 and 404 may be a device of a same type as, or a different type, from the electronic device 401. All or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

One embodiment may be implemented as software (e.g., the program 440) including one or more instructions that are stored in a storage medium (e.g., internal memory 436 or external memory 438) that is readable by a machine (e.g., the electronic device 401). For example, a processor of the electronic device 401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations, e.g., as illustrated in the flowcharts, performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method comprising:
receiving, at a memory subsystem, a range of system addresses beginning with a base address;
encoding, by an address encoder of the memory subsystem comprising at least one XOR logic gate, the system addresses to generate encoded system addresses, wherein a first number of least significant bits (LSBs) subject to change in encoding each of the system addresses in the range is based on a lesser of:
a second number of trailing 0s in a binary representation of the base address and a third number of trailing 0s in a binary representation of a fourth number of the system addresses in the range,

wherein, in encoding the system addresses in the range the at least one XOR logic gate is configured to apply Gray encoding to the first number of LSBs, and bit values of remaining bits in the encoded system addresses are equal to corresponding bit values in the system addresses; and translating the encoded system addresses to address bus and enable signals of a memory macro of the memory subsystem.

2. The method of claim 1, wherein the range begins with the base address corresponding to a memory subunit, and further comprising:

translating, by an address mapper of the memory subunit, the encoded system addresses into memory addresses for the memory subunit.

3. The method of claim 2, wherein translating the encoded system addresses comprises subtracting the base address from the encoded system addresses.

4. The method of claim 2, further comprising:

receiving the encoded system addresses at an address register of the memory subsystem, wherein the address register provides the encoded system addresses to the address mapper via an address bus.

5. The method of claim 2, wherein the address mapper is one of a plurality of address mappers of the memory subsystem, the memory subunit is one of a plurality of memory subunits of the memory subsystem, the range is one of a plurality of disjoint system address ranges received and encoded at the memory subsystem, each of the plurality of address mappers corresponds to a respective one of the plurality of memory subunits, and each of the plurality of memory subunits corresponds to a respective one of the plurality of disjoint system address ranges and a respective base address.

6. The method of claim 5, wherein: LSBs subject to change in encoding the plurality of disjoint system address ranges are determined based on a lesser of a plurality of the second number and a plurality of the third number across the plurality of the disjoint system address ranges; or the LSBs subject to change in encoding each of the disjoint system address ranges are individually determined based on the lesser of the second number and the third number of a respective address range of the plurality of disjoint system address ranges.

7. The method of claim 5, further comprising:

providing the encoded system addresses to each of the plurality of address mappers via an address register and an address bus of the memory subsystem, wherein, for memory subunits of the plurality of memory subunits, having corresponding system address ranges outside of the range, corresponding address mappers translate the encoded system addresses to a mapped value of zero.

8. A memory subsystem, comprising:

an address encoder comprising at least one XOR logic gate, the address encoder configured to:

receive a range of system addresses beginning with a base address;

encode the system addresses to generate encoded system addresses, wherein a first number of least significant bits (LSBs) subject to change in encoding each of the system addresses in the range is based on a lesser of a second number of trailing 0s in a binary representation of the base address and a third number of trailing 0s in a binary representation of a fourth number of the system addresses in the range, wherein, in encoding the system addresses in the range the at least one XOR logic gate is configured to apply Gray encoding to the first number of LSBs, and bit values of remaining bits in the encoded system addresses are equal to corresponding bit values in the system addresses; and translate the encoded system addresses to address bus and enable signals of a memory macro of the memory subsystem.

9. The memory subsystem of claim 8, further comprising:

a memory subunit, wherein the range begins with the base address corresponding to the memory subunit; and an address mapper configured to translate the encoded system addresses into memory addresses for the memory subunit.

10. The memory subsystem of claim 9, wherein, in translating the encoded system addresses, the address mapper is configured to subtract the base address from the encoded system addresses.

11. The memory subsystem of claim 9, further comprising an address register configured to receive the encoded system addresses and provide the encoded system addresses to the address mapper via an address bus.

12. The memory subsystem of claim 9, further comprising a plurality of address mappers and a plurality of memory macros, wherein the range is one of a plurality of disjoint system address ranges received and encoded at the address encoder, each of the plurality of address mappers corresponds to a respective one of the plurality of memory subunits, and each of the plurality of memory subunits corresponds to a respective one of the plurality of disjoint system address ranges and a respective base address.

13. The memory subsystem of claim 12, wherein the address encoder is configured to:

determine LSBs subject to change in encoding the plurality of disjoint system address ranges based on a lesser of a plurality of the second number and a plurality of the third number across the plurality of the disjoint system address ranges; or individually determine the LSBs subject to change in encoding each of the disjoint system address ranges based on the lesser of the second number and the third number of a respective address range of the plurality of disjoint system address ranges.

14. The memory subsystem of claim 12, wherein:

the address encoder is further configured to provide the encoded system addresses to the plurality of address mappers via an address register and an address bus of the memory subsystem, wherein, for memory subunits of the plurality of memory subunits, having corresponding system address ranges outside of the range, corresponding address mappers are configured to translate the encoded system addresses to a mapped value of zero.

15. A user equipment (UE) comprising:

a processor;

an address encoder comprising at least one XOR logic gate; and a non-transitory computer readable storage medium storing instructions that, when executed, cause the processor to:

encode, using the address encoder, a range of system addresses beginning with a base address to generate encoded system addresses, wherein a first number of least significant bits (LSBs) subject to change in encoding each of the system addresses in the range is based on a lesser of a second number of trailing 0s in a binary representation of the base address and a third number of trailing 0s in a binary representation of a fourth number of the system addresses in the range, and bit values of remaining bits in the encoded system addresses are equal to corresponding bit values in the system addresses; and translate the encoded system addresses to address bus and enable signals of a memory macro of a memory subsystem.

16. The UE of claim 15, wherein the range begins with the base address corresponding to a memory subunit, and the instructions further cause the processor to:

translate the encoded system addresses into memory addresses for the memory subunit.

17. The UE of claim 15, wherein the range of system addresses is encoded by performing Gray encoding.

18. The UE of claim 16, wherein, in translating the encoded system addresses, the base address is subtracted from the encoded system addresses.

* * * * *